March 19, 1935.  R. E. SMITH  1,994,672
SPREADER
Filed Nov. 20, 1933  3 Sheets-Sheet 1
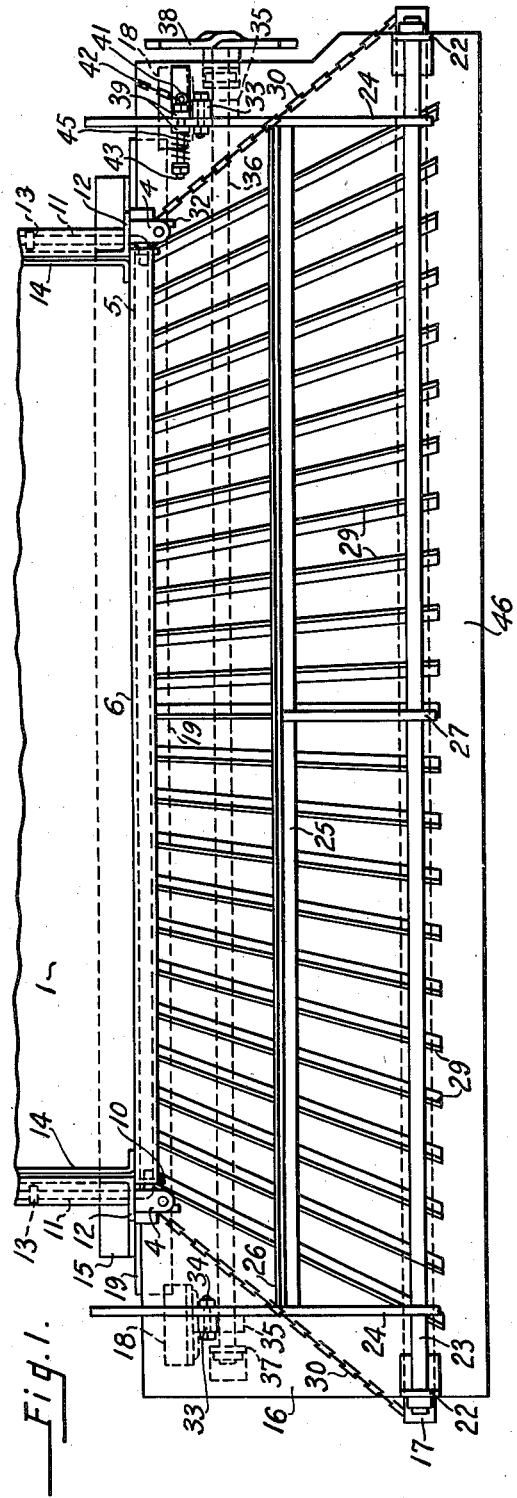
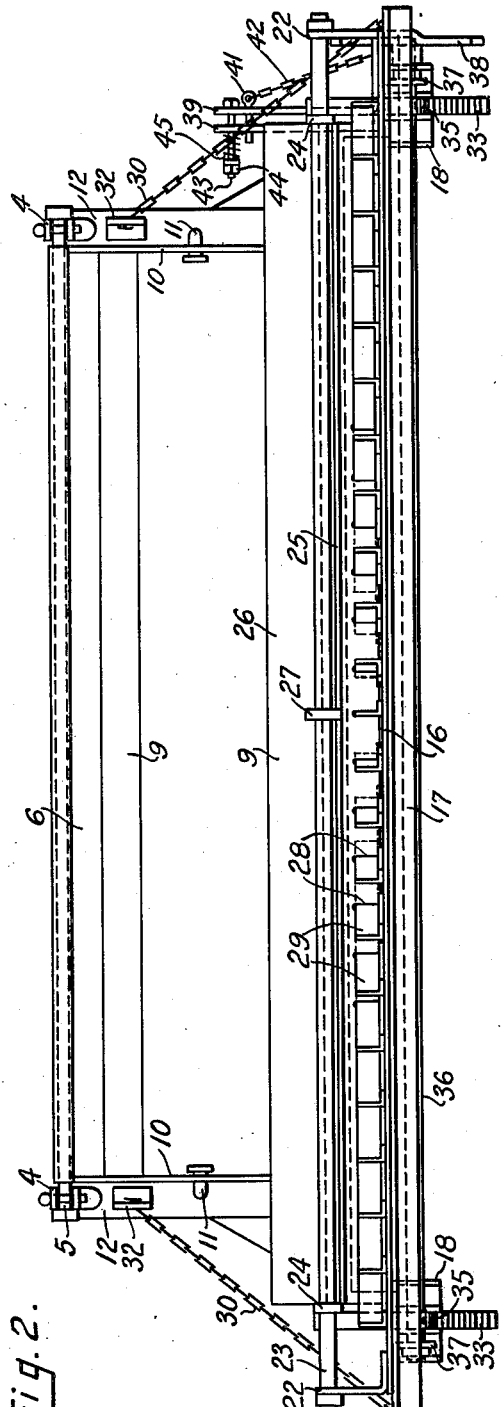
INVENTOR
RALPH E. SMITH.
BY Toulmin & Toulmin
ATTORNEYS March 19, 1935.  R. E. SMITH  1,994,672
SPREADER
Filed Nov. 20, 1933  3 Sheets-Sheet 2
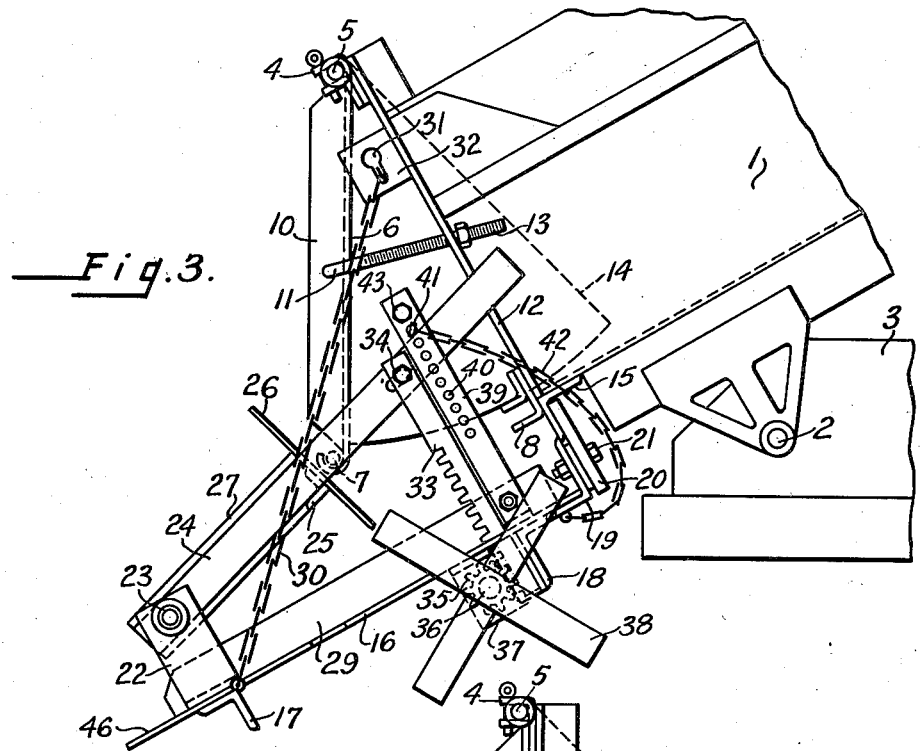
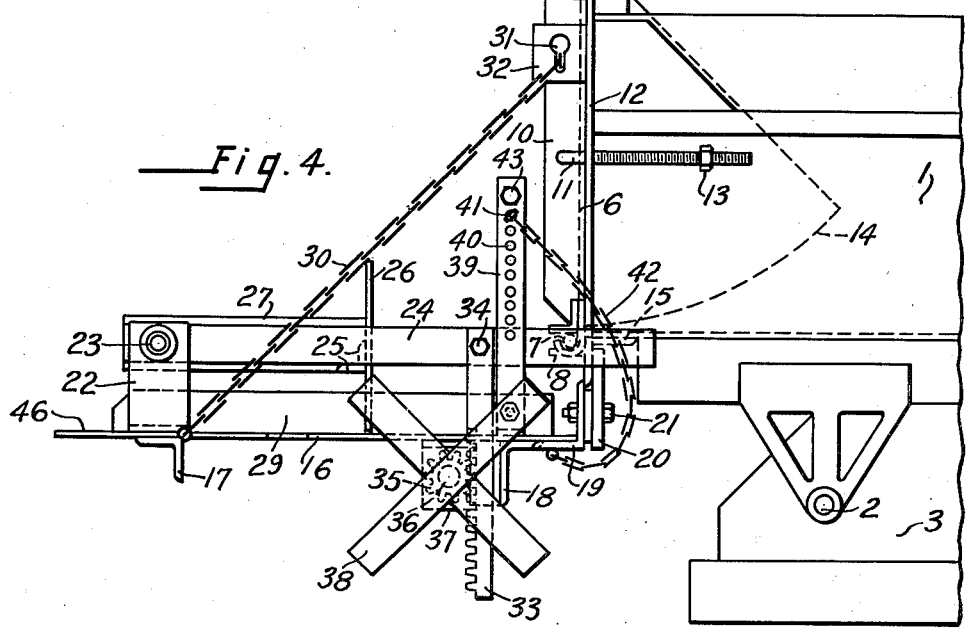
INVENTOR
RALPH E. SMITH.
BY Toulmin & Toulmin
ATTORNEYS March 19, 1935.  R. E. SMITH  1,994,672
SPREADER
Filed Nov. 20, 1933  3 Sheets-Sheet 3
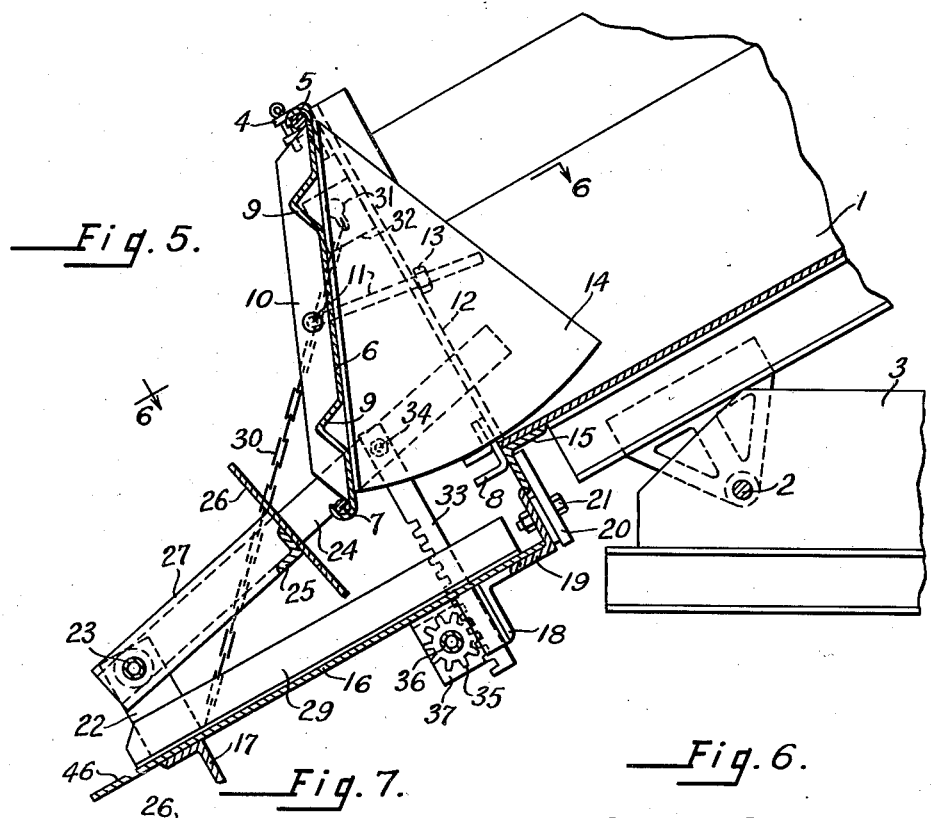
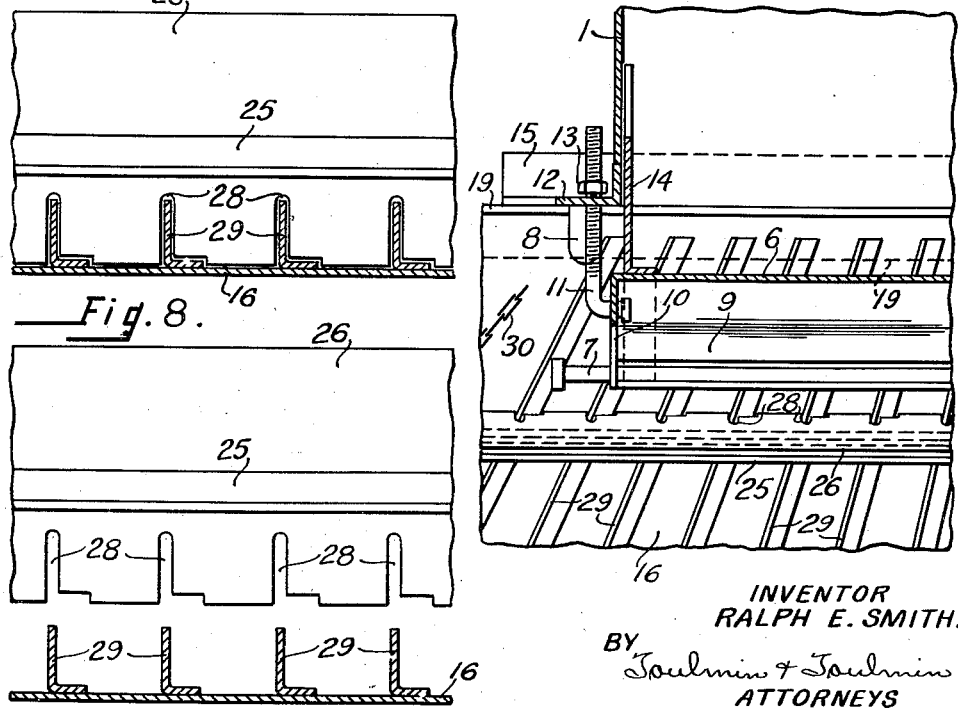
INVENTOR
RALPH E. SMITH.
BY
Toulmin & Toulmin
ATTORNEYS Patented Mar. 19, 1935

1,994,672

UNITED STATES PATENT OFFICE 1,994,672

SPREADER

Ralph E. Smith, Galion, Ohio, assignor to The Galion Metallic Vault Co., Galion, Ohio, a corporation of Ohio Application November 20, 1933, Serial No. 698,750

7 Claims. (Cl. 275—14)

This invention relates to improvements in spreaders such as are used for spreading crushed stone, sand, gravel, slag, cinders and other material for road construction purposes. While the spreader is well adapted for road purposes it may be used for other purposes, such as spreading fertilizer.

This invention has for its object to provide an apparatus somewhat in the nature of an attachment, for attachment to the rear end of a dump truck for distributing the material as it flows from the tilted body of the truck.

It is particularly the object of this invention to provide, in connection with an attachment of this kind, means for evenly distributing the material over a wide area, and means for limiting the amount of material delivered in any given length of time.

It is also an object of the invention to provide a spreader attachment in the form of a platform adapted to be supported on the rear end of a dump body, fins on the platform for distributing the material evenly over the discharging edge of the platform, together with adjustable means for controlling the speed at which the material is discharged.

These and other objects will appear from the following description taken in connection with the drawings.

Referring to the drawings:

Figure 1 is a top plan view of the spreader, showing the spreader attached to the rear end of a dump body, and showing a top plan view of part of the rear end of such body.

Figure 2 is a rear elevation of the spreader and the dump body to which it is attached.

Figure 3 shows the spreader attachment in combination with the rear end of a dump body in position for dumping and spreading purposes.

Figure 4 shows the attachment on the rear end of a dump body, with the body and the attachment in a horizontal position.

Figure 5 is a vertical, longitudinal section through the attachment and part of the body, with the parts in substantially the position shown in Figure 3.

Figure 6 is a section on the line 6—6 of Figure 5, showing one side of the attachment and a part of one side of the dump body.

Figure 7 is a section through the dumping platform just to the rear of the material-controlling gate, with the gate resting upon the platform.

Figure 8 is a view similar to Figure 7 but with the gate supported above the platform so that material may be discharged from the platform.

This spreader is adapted to be attached to the rear end of a dump truck, which has a body 1 pivoted at its rear end, by means of a pivot 2, to the rear end of a frame 3 of a dump truck. At the upper edges and rear end of the body are brackets 4 for supporting an upper rod 5, to which the tail-gate 6 is attached for swinging movement to and from the body for dumping purposes. On the lower end of the tail-gate is a second rod 7 adapted to engage brackets 8 by which the gate is held in locked position so that the rear end of the body may be closed.

The tail-gate is provided with transversely extending ribs 9 and end flanges 10. These flanges extend rearwardly from the body of the truck and at the sides thereof. Each flange has attached thereto one end of a bolt 11, the other end of which extends forwardly through a flange 12 on the end of the body. Each bolt has thereon a nut 13 so that these bolts may be used for limiting the outward and backward swinging movement of the gate, and thereby restrict the opening and the quantity of material discharged from the body onto the platform forming part of the spreader.

At each side of the gate is a wing plate 14. This plate is shown closely engaging the inside surface of the side and serves to guide the material from the body onto the platform of the distributor.

Extending transverse of the body, beneath the bottom thereof, and at the rear end, is an angle iron 15 used to form part of the support for a platform 16 which has adjacent its rear end a transversely extending angle iron 17 and adjacent its front end a second angle iron 18. This second angle iron is slightly removed from the front end of the platform to provide space for a third angle iron 19, having one of its arms attached to the under side of the platform while its other arm is attached by means of plates 20 and bolts 21 to the downwardly extending arm of the angle iron 15. The plates 20 are rigidly attached in some suitable manner to the angle iron 15.

At opposite ends of the platform and at the rear edge thereof are upwardly extending brackets 22. There are two of these brackets, one at each end of the platform, which serve to support a transverse rod 23. This rod 23 supports a pair of levers 24, each of which is pivoted at one end to the rod 23 and extends forwardly toward the dump body. Intermediate the ends of these levers, and between them, is located an angle iron 25, the lower arm of which extends below the two levers while the upper arm is between the two levers and suitably attached thereto by some means.

Intermediate the levers and between the rod 23 and the angle iron 25, is a strengthening member 27 somewhat wider than the levers. The angle iron 25 is used to support a gate or spreader plate 26, which has slots 28 in the lower edge thereof adapted to receive fins 29 located on the upper surface of the platform. These fins diverge from the front end of the platform toward its rear end for the purpose of equally distributing the material to the rear end of the platform.

It will be observed from an examination of Figures 1 and 2 that the lateral extent of the platform is considerably greater than the width of the dump body. By means of these diverging fins the material is distributed so that it will cover a much wider area as it leaves the rear end of the platform than it covers as it enters the platform. As a matter of fact, when the material enters the platform its lateral extent is about five feet, or a little more, whereas its lateral extent when leaving the rear edge of the platform may be as much as nine feet, due to the divergence of the fins.

In order to support the rear of the platform chains 30 are provided, one on each lateral part of the platform. The lower end of each chain is attached to the platform adjacent the angle iron 17 and extends upwardly and engages a keyhole slot 31 in a bracket 32 attached to the upper part of the rear end of the body. By means of this keyhole slot the tension of the chain may be adjusted. Each lever 24 has attached thereto at 34, one end of a rack bar 33. The other ends of these rack bars are engaged by pinions 35 mounted on a shaft 36 supported on brackets 37 located on and supported beneath the platform. The shaft is rotated by means of arms 38 located on one end of the shaft.

For the purpose of holding the levers 24 and the gate 26 in adjusted position, a pair of links 39 is arranged at one lateral edge of the platform and attached thereto in some suitable manner. The upper ends of these links are provided with aligned holes 40 through which a pin 41 may be inserted for limiting the upward movement of the levers 24. By placing this pin in various seats and aligned holes the extent of the upward movement of the levers may be varied to vary the space between the lower edge of the gate 26 and the platform. This pin 41 is supported by means of a chain 42, attached at one end to the pin and at the other end to some part of the body.

The upper ends of the links 39 are held in resilient relationship with each other by means of a bolt 43 which passes through suitable holes in the links and has on one end a nut 44, which has between it and the adjacent link a spring 45. This spring, in combination with the bolt 43, tends to hold the links 39 in engagement with one of the levers 24. The part of the platform to the rear of the ends of the fins is indicated by the numeral 46. The diverging nature of the fins tends to distribute the material throughout the whole width of the platform, but as the material moves toward the rear edge of the platform it tends to assume a large number of little streams which mingle before they reach the rear edge because of the termination of these fins short of the rear edge of the platform. By this arrangement the material as it leaves the edge of the platform is in one solid sheet so it is delivered in an equally uniform condition to the surface over which it is desired to spread the material, whatever its nature.

The discharge of the material from the platform may be regulated by the tail-gate 6, the position of which is controlled by means of the bolts 11. It may also be controlled by the platform gate 26, which is adjusted with relation to the platform by means of the rack and pinion mechanism supported thereon.

It will be understood that I desire to comprehend within my invention such modifications as come within the scope of my claims and my invention.

Having thus fully described my invention, what I claim as new and desire to secure by Letters Patent, is:

1. In a spreader, in combination with a dump body, a platform attached at its front edge to the body to receive material therefrom, a plurality of fins on the platform diverging from the front edge to the rear edge of the platform, a gate extending across the platform and having slots therein to receive the fins, and means to support and adjust the gate with relation to the platform.

2. In a spreader, in combination with a dump body, a platform attached at its front edge to the body to receive material therefrom, a plurality of fins on the platform diverging from the front edge to the rear edge of the platform, a gate extending across the platform and having slots therein to receive the fins, and means to support and adjust the gate with relation to the platform, said means including levers pivotally supported by the platform.

3. In a spreader, in combination with a dump body, a platform attached at its front edge to the body to receive material therefrom, a plurality of fins on the platform diverging from the front edge to the rear edge of the platform, a gate extending across the platform and having slots therein to receive the fins, and means to support and adjust the gate with relation to the platform, said means including levers, each lever being pivotally supported at one end by the platform, and means engaging the other ends of the levers to adjust the gate.

4. In a spreader, in combination with a dump body, a platform attached at its front edge to the body to receive material therefrom, a plurality of fins on the platform diverging from the front edge to the rear edge of the platform, a gate extending across the platform and having slots therein to receive the fins, and means to support and adjust the gate with relation to the platform, said means including levers, each lever being pivotally supported at one end by the platform, and rack and pinion mechanism supported by the platform and connected to the other ends of the levers.

5. In combination, a chassis, means for pivotally supporting a dump body on the chassis, a spreader plate extending beyond and below the body, at the rear thereof, a pivoted gate on the body adapted to regulate the flow of material from the body onto the spreader plate when the body is tilted, means on the sides of the gate for closing the space between the gate and the body as the gate is moved, a plurality of diverging guiding fins on the surface of the spreader plate for evenly distributing such material, and means adjacent the bottom of the tilting gate extending over and between the fins on the spreader plate for regulating the flow of material between the fins.

6. In combination, a chassis, means for pivotally supporting a dump body on the chassis, a spreader plate extending beyond and below the body, at the rear thereof, a pivoted gate on the body adapted to regulate the flow of material from the body onto the spreader plate when the body is tilted, means on the sides of the gate for closing the space between the gate and the body as the gate is moved, a plurality of diverging guiding fins on the surface of the spreader plate for evenly distributing such material, means adjacent the bottom of the tilting gate extending over and between the fins on the spreader plate for regulating the flow of material between the fins, and means for adjusting said last-mentioned means.

7. In combination, a chassis, a tiltable body, a swinging tail-gate pivoted at the top of the body having means closing the space between the gate and the sides of the body on either side thereof when the gate is open, a lower spreader plate located below the body beneath the gate, a plurality of diverging fins thereon, and a pivoted spreader plate adapted to be adjustably positioned vertically between and above said fins and below said gate in proximity to the lower edge of the gate.

RALPH E. SMITH.